(12) United States Patent
Smith et al.

(10) Patent No.: US 12,017,701 B2
(45) Date of Patent: Jun. 25, 2024

(54) CAST STRUCTURE TO SUPPORT SUSPENSION ARM AND MOTOR

(71) Applicant: Ford Global Technologies, LLC, Dearborn, MI (US)

(72) Inventors: Kristian Edward Smith, Basildon (GB); Matthew Jeremy Sykes, Wickford (GB); Daniel Charters, Hullbridge (GB); Tyler Powell, Benfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/903,710

(22) Filed: Sep. 6, 2022

(65) Prior Publication Data

US 2024/0075984 A1    Mar. 7, 2024

(51) Int. Cl.
| | |
|---|---|
| *B62D 21/11* | (2006.01) |
| *B60G 7/00* | (2006.01) |
| *B62D 65/12* | (2006.01) |

(52) U.S. Cl.
CPC .............. *B62D 21/11* (2013.01); *B60G 7/001* (2013.01); *B60G 7/008* (2013.01); *B62D 65/12* (2013.01)

(58) Field of Classification Search
CPC ........ B62D 11/11; B62D 65/12; B60G 7/001; B60G 7/008
See application file for complete search history.

(56) References Cited

U.S. PATENT DOCUMENTS

| 6,022,035 A * | 2/2000 | Habich ................. B60G 7/001 |
| | | 280/124.133 |
| 9,045,029 B2 | 6/2015 | Mair et al. |
| 2009/0095123 A1* | 4/2009 | Weagle .................... B62M 3/08 |
| | | 74/560 |
| 2019/0217894 A1* | 7/2019 | Upah ..................... B62D 3/126 |
| 2020/0298715 A1* | 9/2020 | Murai ..................... H02J 50/10 |
| 2022/0306202 A1* | 9/2022 | Ito .......................... B62D 21/09 |

FOREIGN PATENT DOCUMENTS

| CN | 207015142 U | 2/2018 |
| CN | 211076060 U | 7/2020 |

* cited by examiner

*Primary Examiner* — Jason D Shanske
*Assistant Examiner* — Matthew James O'Neill
(74) *Attorney, Agent, or Firm* — Haley Guiliano LLP

(57) ABSTRACT

A cast structure configured to support a suspension arm and motor mount assembly for a vehicle is disclosed. The cast structure comprises a first fixing point attachable to a first mounting feature of a first crossmember of a vehicle frame, a first feature configured to receive the suspension arm of the vehicle in an assembled configuration, and a first portion configured to support a motor of the vehicle in an assembled configuration.

19 Claims, 10 Drawing Sheets

Fig. 1
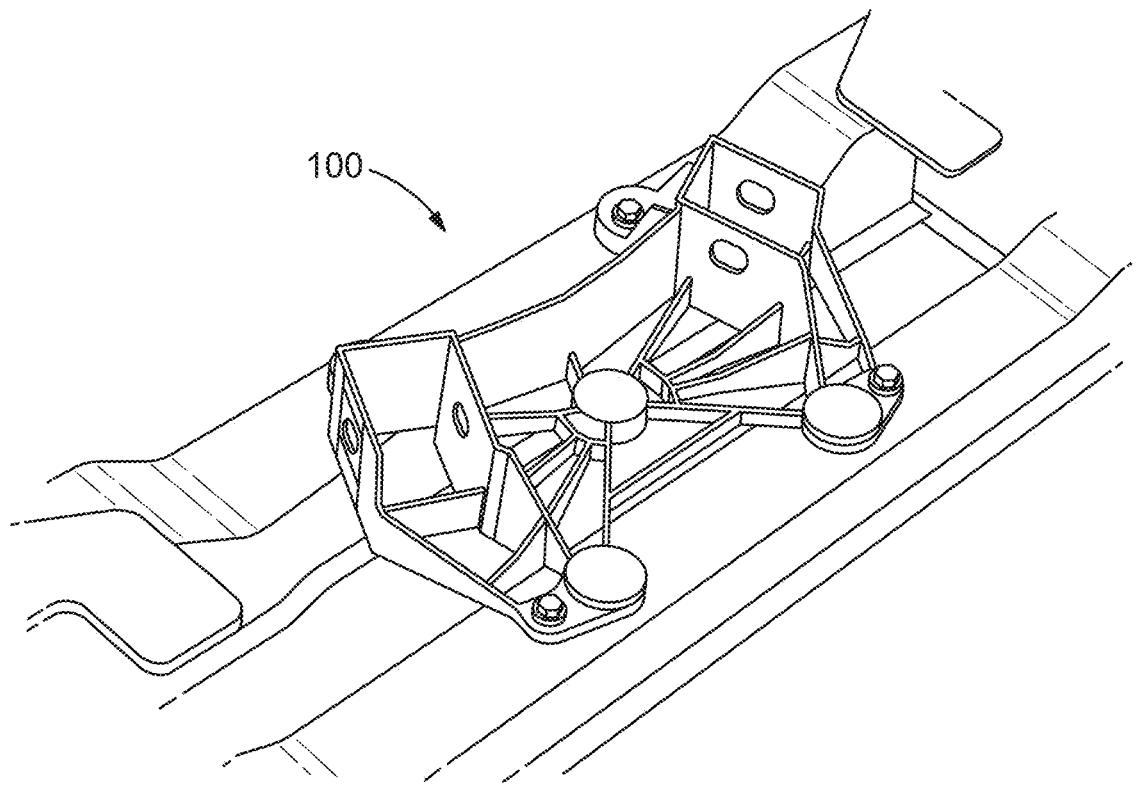
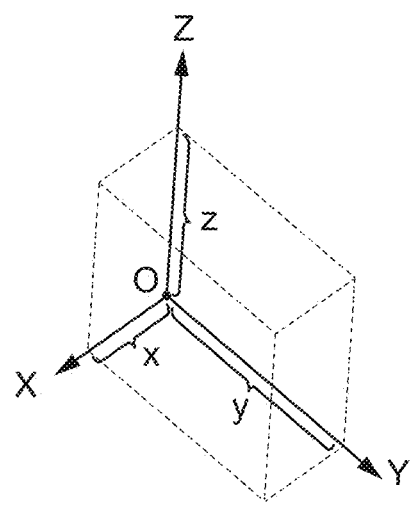

CAST STRUCTURE TO SUPPORT SUSPENSION ARM AND MOTOR

BACKGROUND

This invention relates to a cast structure for a vehicle. More particularly, but not exclusively, this invention relates to a cast structure to receive a suspension arm and support a motor or motor mount for an electric or hybrid commercial vehicle having an electric motor.

SUMMARY

In the development of Battery-Electric Commercial Vehicles, there is limited space in the rear of the vehicle to package all relevant systems. In particular, the drive unit (e.g., electric motor), the suspension arms, and relevant routables (e.g., power cables) need to be redesigned to meet packaging restrictions in the vehicle undercarriage. In addition to packing requirements, there are cost and weight targets to reach, due to the large size of the electric battery present in, for example, electric commercial vehicles. Typically, current suspension leading/trailing arms (STA) of the suspension are supported by a large welded sheet steel structure, that is made up of approximately 10-15 individual components welded together and then to the body or vehicle frame. The primary drive unit (PDU) mount is currently aluminium cast, but only has the functionality of supporting the PDU. Cost limitations prevent individual components from being shaped around existing body structures such as vehicle frame cross-members.

The art comprises front and rear cast aluminium connectors of an all-aluminium frame type vehicle body (e.g., the front wall assembly, the front floor assembly and the rear floor assembly are connected through an aluminium casting), and leading or trailing arm vehicle suspension systems comprising of a fabricated vehicle axle and a fully integrated beam casting (e.g., each arm assembly including an axle bracket made from an aluminium casting). However, a front and rear cast aluminium connector of an all-aluminium frame type vehicle body, a leading or trailing arm vehicle suspension system comprised of a fabricated vehicle axle and a fully integrated beam casting do not disclose a single aluminium casting that performs the function of suspension trailing arm attachment structure, and drive unit front mount.

A single cast (e.g., an aluminium casting) that performs the function of the suspension trailing arm attachment structure and drive unit front mount is provided herein. The disclosure replaces the current structure, which comprises 13 welded pieces, with a single cast component that provides fixing locations for both suspension connections, as well as a support structure to connect to the primary bush of the PDU. As such, tool clearances can be predesigned into the casting for faster assembly.

While the advantages of the present disclosure will be apparent to a skilled person in the field, by way of example, the present disclosure provides a component reduction of current suspension system solutions (i.e., 10-15 sheets of steel on average to 1 casting); reduced complexity in manufacturing processes (i.e., no welding required, and approximately 4 connection points to the body structure/frame); improved tolerances for suspension connection points vs. current welded structures (i.e., more accurate fixing locations); improved cross span of drive unit front mounting (i.e., an improved stiffness); reduction in cost and weight due to time, complexity and material savings; and a reduction in complexity of body cross members.

According to a first aspect of the invention, there is provided a cast structure configured to support a suspension arm and motor of a vehicle. The cast structure comprises: a first fixing point attachable to a first mounting feature of a first cross member of a vehicle frame; a first feature configured to receive the suspension arm of the vehicle in an assembled configuration; and a first portion configured to support a motor of the vehicle in an assembled configuration.

In some examples, the first feature configured to receive the suspension arm of the vehicle comprises a first fixing location for the suspension arm. In some examples, the first portion comprises a motor mount. In some examples, the motor mount shares a common fixing with the cast structure. In some examples, the motor mount is integral to the cast structure. In some examples, the cast structure further comprises secondary isolation bushings on the motor mount. In some examples, the first fixing point attached to the first mounting feature comprises secondary isolation bushings.

In some examples, the single cast structure comprises tool clearances for the first fixing points. In some examples, the tool clearances are in a vertical axis, orthogonal to a longitudinal and a lateral axis of the cast structure.

In some examples, the single cast structure further comprises a plurality of second fixing points attachable to a second mounting feature of a second cross member of the vehicle frame, wherein the single cast structure spans a gap between the first and second cross member of the vehicle. In some examples, the first fixing point and plurality of second fixing points are in the same lateral plane, bound by lateral and longitudinal axes. In some examples, the first fixing point and plurality second fixing points are distributed across the lateral plane. In some examples, the plurality of second fixing points extend across the length of the second cross member of the vehicle frame.

In some examples, the cast structure is symmetrical about the longitudinal axis. In some alternative examples, the cast structure is asymmetrical about the longitudinal axis, the asymmetry based on a centre of mass location of the cast structure and motor in an assembled configuration.

In some examples, the cast structure further comprises an extended portion attachable to a second mounting feature of the vehicle frame, wherein the extended portion replaces the first crossmember of the vehicle.

In some examples, the single cast structure is cast in aluminium or an aluminium alloy. Cast aluminum is preferred due to its strength, heat resistance, and lightness.

According to a second aspect of the invention, there is provided a vehicle subframe assembly comprising the cast structure of the first aspect. In particular, the vehicle subframe assembly comprises a suspension arm; and a cast structure, cast structure comprising: a first fixing point attachable to a first mounting feature of a first crossmember of a vehicle frame; a first feature configured to receive the suspension arm of the vehicle in an assembled configuration; and a first portion configured to support a motor of the vehicle in an assembled configuration.

In some examples, the assembly further comprises a motor of the vehicle attached to the cast structure According to a third aspect of the invention, there is provided a vehicle comprising the vehicle subframe assembly as described in the second aspect. In particular, the vehicle comprises a body portion having mounting features and the subframe assembly comprises a suspension arm; and a cast structure, cast structure comprising: a first fixing point attachable to the body portion; a first feature configured to receive the suspension arm of the vehicle in an assembled configuration; and a first portion configured to support a motor of the vehicle in an assembled configuration.

According to a fourth aspect of the invention, there is provided a vehicle assembly method for assembling a suspension arm and a cast structure to a vehicle, the cast structure configured to support a suspension arm and a motor of the vehicle, and the cast structure comprising: a first fixing point attachable to a first mounting feature of a first crossmember of a vehicle frame; a first feature configured to receive the suspension arm of the vehicle in an assembled configuration; and a first portion configured to support a motor of the vehicle in an assembled configuration, the method comprising: attaching the suspension arm to the first feature; attaching the motor to the first portion; and installing the cast structure to the vehicle frame.

In some examples, the suspension arm is attached to the cast structure prior to installation to the vehicle frame. In some examples, the method further comprises attaching a motor mount to the first portion before attaching the motor to the first portion.

These examples and other aspects of the invention will be apparent from and elucidated with reference to the example (s) described hereinafter. It should also be appreciated that particular combinations of the various examples and features described above and below are often illustrative and any other possible combination of such examples and features are also intended, notwithstanding those combinations that are clearly intended as mutually exclusive (e.g., alternatives, such as casting material for the single cast structure).

BRIEF DESCRIPTION OF THE DRAWINGS

The above and other objects and advantages of the disclosures herein will be apparent upon consideration of the following detailed description, taken in conjunction with the accompanying drawings, in which:

FIG. 1. illustrates a 3D perspective view of a cast structure, in accordance with some aspects of the present disclosure;

DETAILED DESCRIPTION

Figure 2:
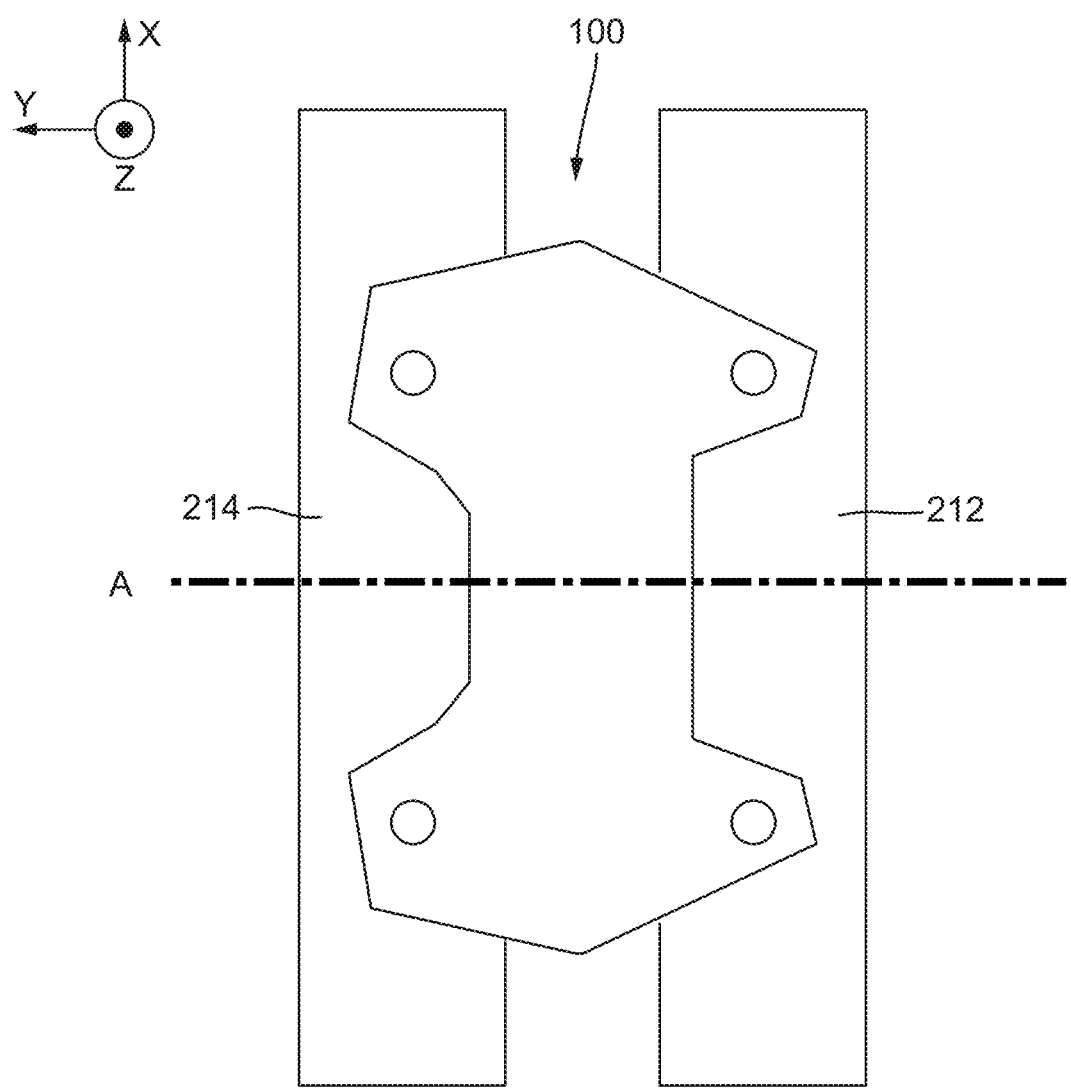
FIG. 2. illustrates a vertical axis view (e.g., the z-direction) of a cast structure, in accordance with some aspects of the present disclosure.

It should be understood that the detailed description and specific examples herein while indicating exemplary embodiments, are intended for purposes of illustration only and are not intended to limit the scope of the invention. These and other features, aspects, and advantages of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

FIG. 1. illustrates a 3D perspective view of a casting structure 100, in accordance with some aspects of the present disclosure. In the development of Battery Electric Commercial Vehicles, there is limited space in the rear (or sometimes front) of the vehicle to package all relevant systems, in particular the drive unit (e.g., an e-machine), suspension leading/trailing arms (referred to herein as suspension arms), and routables (e.g., wires for vehicle systems), as well as a significant cost and weight target to reach, due to the large size of the battery. A casting (e.g., an aluminium casting) to perform the role of supporting a power unit (e.g., an electric motor or mount for a motor) and receiving a suspension arm assembly would reduce the weight and cost of the rear and/or front-end system, whilst also providing clipping options for routables, reduction in components and complexity of manufacturing processes, and improved tolerances for manufacturing.

A casting also provides the advantage of being able to be designed and manufactured in CAD/CAM applications and can have more "organic" shapes and designs that would be technically challenging to conventionally manufacture or create (e.g., by welding separate components). In particular, the casting can be readily altered and features can be added wherever needed, for example, to help reduce the number of brackets that are in and around the vehicle, build in channels for wires and pipes, or easily be adapted for another vehicle platform with improved tolerances. In some examples, the casting is made by any known casting method, such as, for example, sand casting, shell mould casting, gravity die castings, pressure die casting, investment casting, silica sol casting, lost foam casting, and the like. Pressure die casting services produce geometrically complex castings, primarily from non-ferrous alloys such as aluminium and zinc. The production process allows thin walls to be created within castings that are strong. Moreover, casting, in particular pressure die casting, has many benefits; casting large quantities, casting complex shapes quickly and accurately, high strength, fast production rate, low labour-intensive production lines, and scrap metal can be easily recycled—the present casting benefits from all of these advantages compared to the current art of welding multiple pieces sheet steel together.

As mentioned above, current suspension arms are supported by a large, welded sheet steel structure, that is made up of approximately 10-15 individual components welded together and then to the body of the vehicle. In particular, the piece is welded across the vehicle subframe members, such as cross members 212 and 214 of FIG. 2. FIG. 2. illustrates a top-down view (i.e., in the z-direction) of a cast structure 100 of FIG. 1, in accordance with some aspects of the present disclosure. In particular, FIG. 2 shows how the cast structure comprises a first fixing point attachable to a first mounting feature of a first crossmember 212 of a vehicle frame of the vehicle frame. In some examples, the cast structure comprises a plurality second of fixing points attachable to a second mounting feature 214 of a second crossmember of the vehicle frame. In some further examples, the single cast structure spans a gap between the first and second crossmember of the vehicle.

In some examples, the cast structure is symmetrical about the longitudinal axis, as defined by the dotted line A on FIG. 2. In some alternative examples, the cast structure is asymmetrical about the longitudinal axis, the asymmetry based on a centre of mass of the cast structure and motor in an assembled configuration. For example, when the motor and cast structure are assembled the centre of mass of the assembled structure may be some distance away from the longitudinal axis, therefore, it may be required to offset the fixings to account for a torque force put through the cast structure due to the motor when in operation.

In some examples, the first fixing point and plurality of second fixing points are in the same lateral plane, bound by lateral and longitudinal axes. In some examples, the first fixing point and plurality second fixing points are distributed across the lateral plane. In some examples, the plurality of second fixing points extend across the length of the second crossmember of the vehicle frame.

Figure 3:
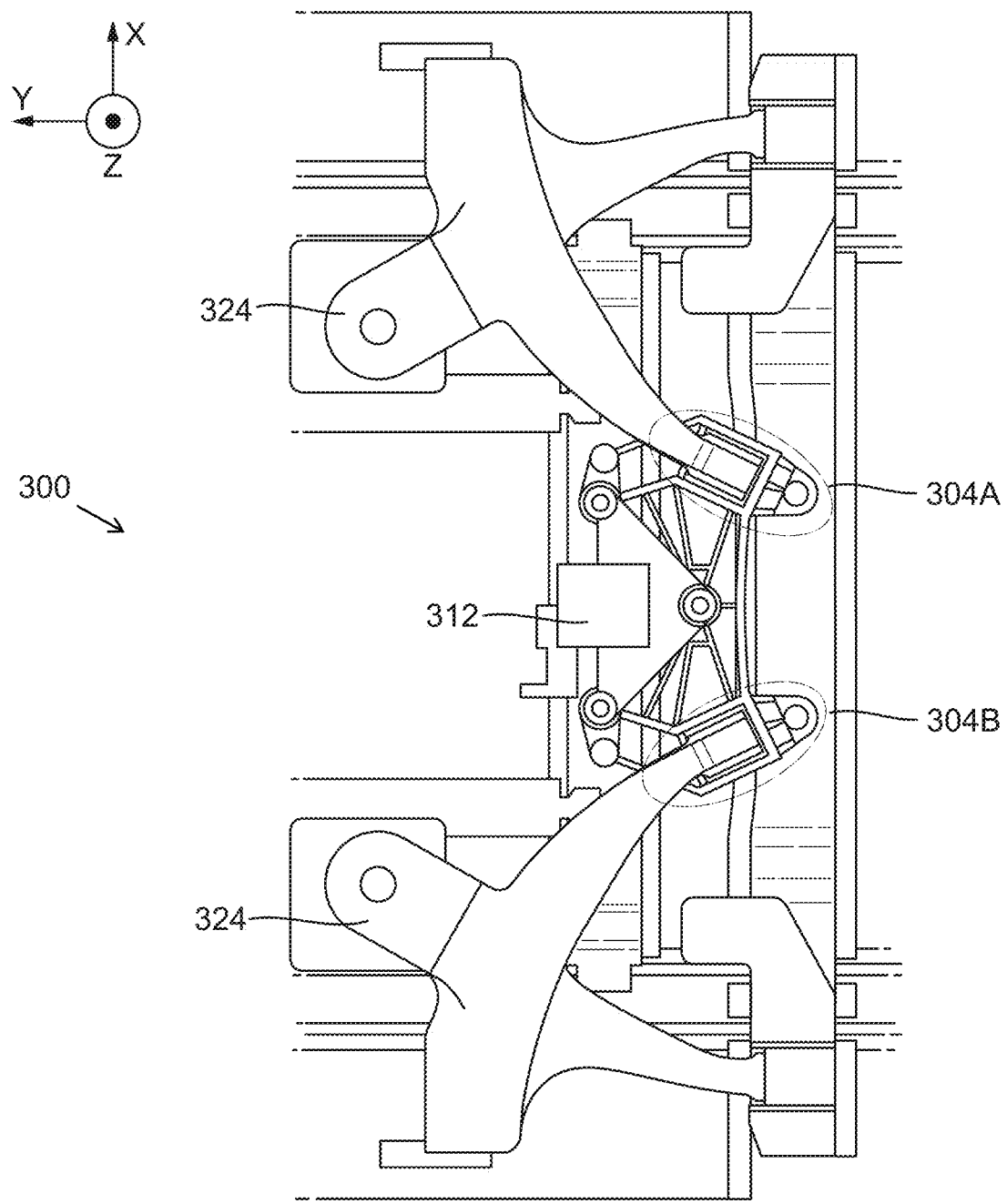
FIG. 3. illustrates a vertical axis view of a vehicle suspension assembly comprising a suspension arm and motor mount affixed to a cast structure, in accordance with some aspects of the present disclosure.

FIG. 3. illustrates a vertical axis view of a vehicle suspension assembly comprising a suspension arm and motor mount affixed to a cast structure, in accordance with some aspects of the present disclosure. The vehicle subframe assembly 300 comprises the cast structure. In particular, the vehicle subframe assembly 300 comprises a suspension arm 324; and a cast structure, cast structure comprising a first feature 304A-B configured to receive the suspension arm of the vehicle in an assembled configuration. In addition, the cast structure comprises a first portion 312 configured to support a motor of the vehicle in an assembled configuration. As shown in FIG. 3, the first portion comprises a motor mount. In some examples, the motor mount shares a common fixing with the cast structure, that is to say, that the fixing used to attach the cast structure to the vehicle subframe also attached the motor mount to the cast structure—doubling up the fixings, simplifying the installation of the unit to the vehicle. In some examples, the motor mount is integral to the cast structure, that is to say, it is not a separate piece to be attached to the casting but is a part of the casting from the outset. In some examples, the assembly further comprises a motor of the vehicle attached to the cast structure.

The motor mount 312, also known as a primary drive unit (PDU) mount, is preferably an aluminium pressure die casting. The motor mount only has the functionality of supporting the PDU (e.g. the motor). By developing a larger casting which supports and receives both the suspension arm assembly 324 and the PDU mount 312, the overall system has been significantly simplified compared to the art. In particular, moving to a simple body-mounted solution to fix the assembly means that the suspension arms and PDU mount can be preassembled before being fixed to the vehicle. In some examples, the PDU mount may also comprise the PDU prior to assembly also.

To accommodate the PDU mount and suspension arms the single casting comprises a first receiving portion 304A-B to receive the suspension arms of the vehicle in an assembled configuration, and a second receiving portion 312 to support the motor of the vehicle in an assembled configuration, as shown in FIG. 3.

Figure 4:
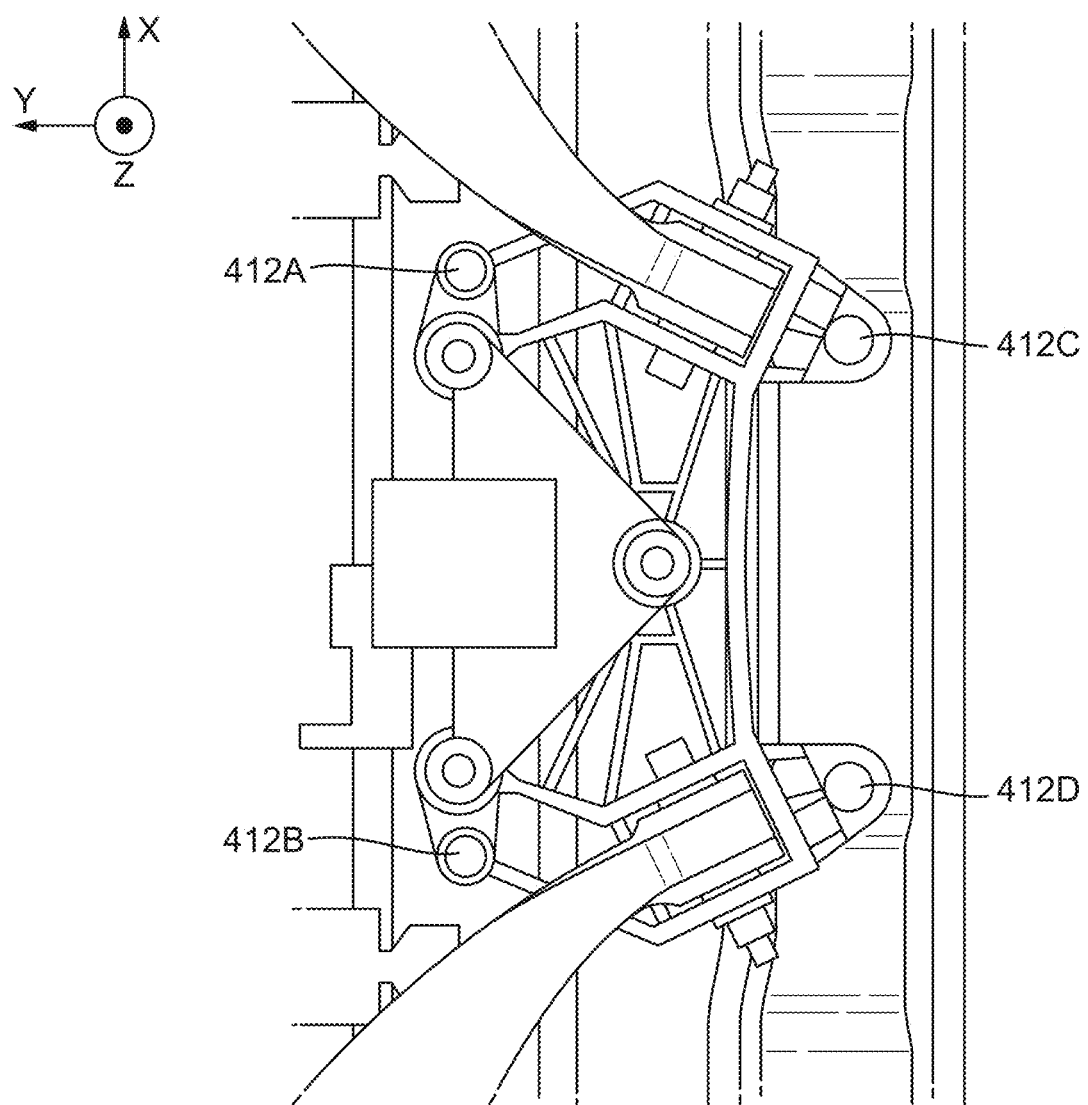
FIG. 4. illustrates a vertical axis view of fixings for a cast structure to a vehicle subframe, in accordance with some aspects of the present disclosure.
Figure 5:
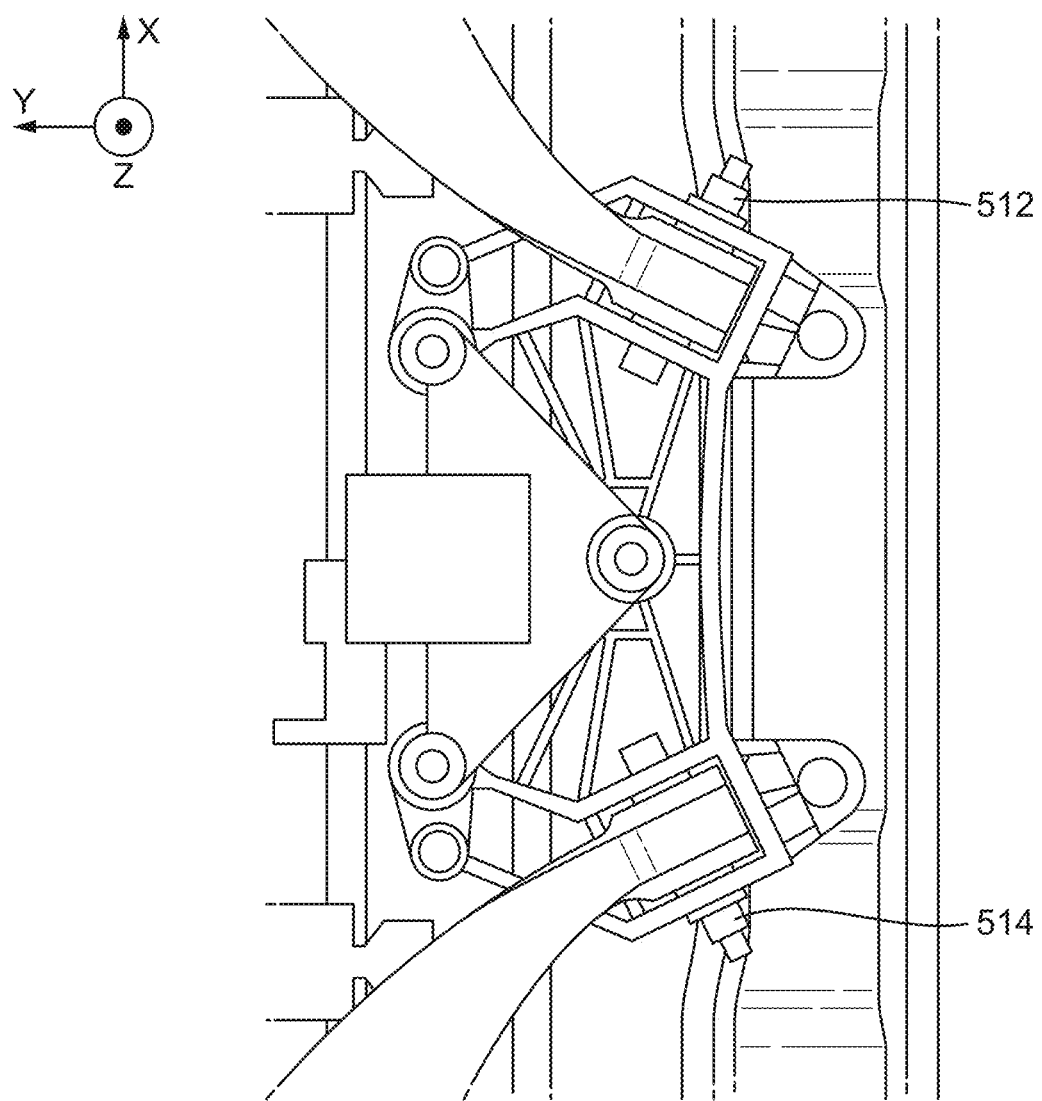
FIG. 5. illustrates a vertical axis view of the fixings for a suspension arm to a cast structure, in accordance with some aspects of the present disclosure.

FIG. 4. illustrates a vertical axis view of fixings 412A-D for a cast structure to a vehicle subframe, in accordance with some aspects of the present disclosure. While a primary focus of the present disclosure relates to cast structure that performs the function of supporting a suspension arm and a motor, in some examples, the cast structure also comprises tool clearances for the fixings 412A-D. Moreover, as shown in FIG. 5, due to the oblique angles of the fixings for the suspension arms of the vehicle, the fixings 512A-B can be preassembled to the cast structure, along with the motor mount, as shown in FIG. 5. FIG. 5. illustrates a vertical axis view of the fixings for a suspension arm to a cast structure, such an oblique angle of fixings is typically time-consuming and difficult, especially if there are vehicle packing restrictions in the X & Y direction in the vehicle during assembly, which is common on a large scale production. The present disclosure overcomes this problem by allowing preassembly and then simple installation into the vehicle.

Figure 6:
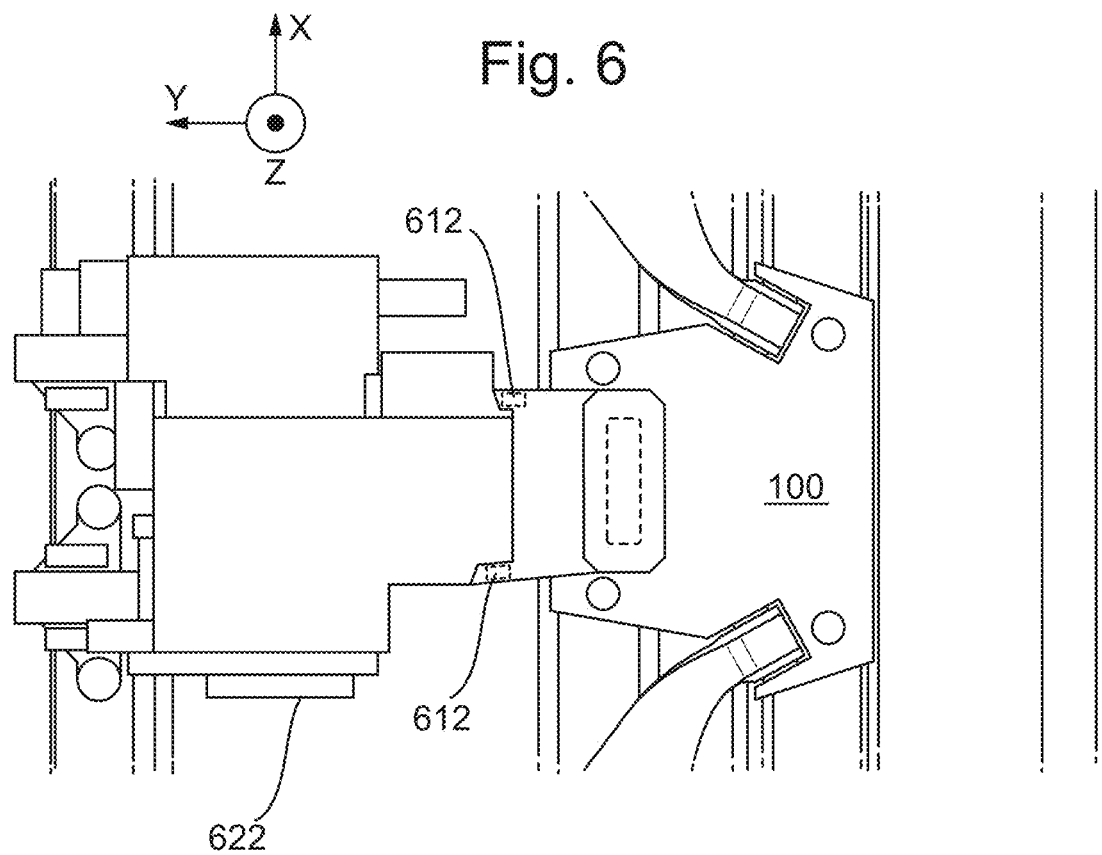
FIG. 6. illustrates a vertical axis view of secondary isolation bushings (e.g., mount bushings) for a motor mounted to a cast structure, in accordance with some aspects of the present disclosure.
Figure 7:
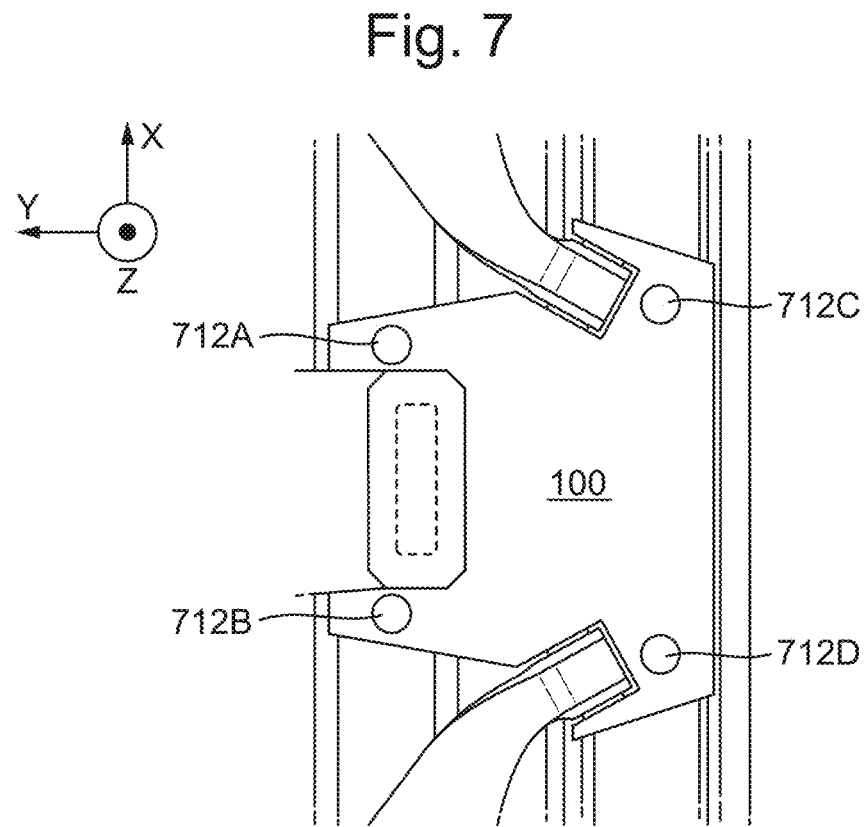
FIG. 7. illustrates a vertical axis view of an alternative secondary isolation bushings arrangement for a single casting suspension and drive assembly, in accordance with some aspects of the present disclosure.

FIG. 6. illustrates a vertical axis view of secondary isolation bushings 612 (e.g., mount bushings) for a motor 622 mounted to a cast structure 100, in accordance with some aspects of the present disclosure. A motor mount (whether a separate article attached to the cast structure or integral to the cast structure itself) may further comprise secondary isolation bushings 612. FIG. 7. illustrates a vertical axis view of an alternative secondary isolation bushings arrangement 712A-D for a single casting suspension and drive assembly, in accordance with some aspects of the present disclosure. FIG. 7. illustrates how the secondary isolation bushings 712A-D for a single casting suspension and drive assembly can be located between the single casting and the vehicle subframe cross member, such as cross member(s) 212 and 214. Both secondary isolation modalities would not be possible, or practically very difficult, with a system comprising a plurality of steel sheets welded together, and then to the cross members directly. In a steel system, FIGS. 6 and 7 cannot be made, due to the parts being welded together. In particular, in the system shown in FIG. 6, the secondary isolation bushings being located between the mount and the PDU 612, is not possible due to packing constraints. The cast structure, with its reduction in packing size, enables the secondary isolation bushings to be mounted in this way without significant changes to the vehicle packing as the motor and the mount does not need to move to accommodate the bushings.

Bushings play an important role in high-stress applications where vibrations are problematic. Automotive suspension systems, for example, often feature control arms with bushings that connect the vehicle's struts or shocks to the chassis. The control arms themselves are metal, but the bushings are padded with a soft material (such as rubber or neoprene) that dampens vibrations created while driving. Additional bushings in the system, such as that disclosed herein, improve the control arms ability to absorb vibrations, resulting in an improved ride for the vehicle's driver and passengers. Depending on the NVH requirements in designing in the vehicle, dual isolation can be provided in the suspension and PDU mount cast assembly.

Figure 8:
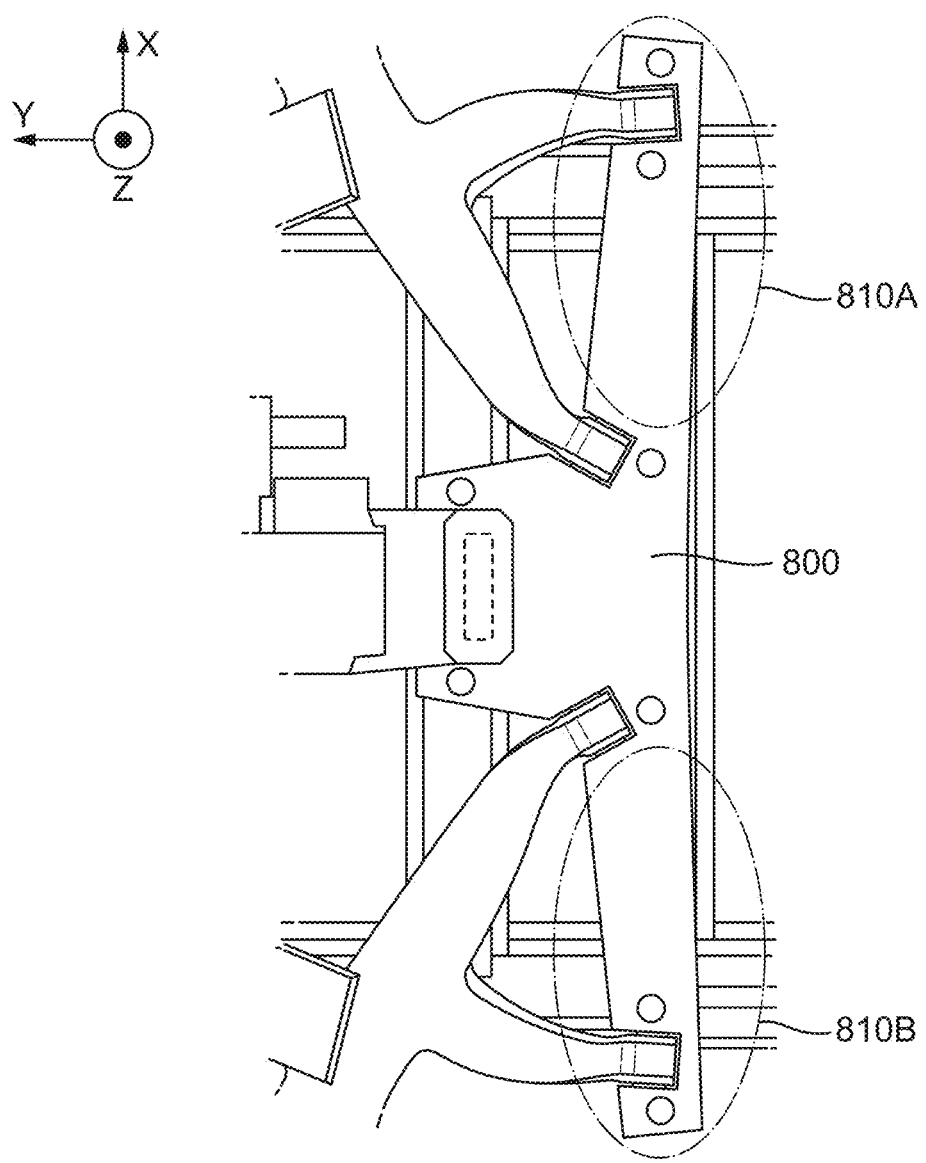
FIG. 8 illustrates a further exemplary cast structure, in accordance with at least one aspect of the present disclosure.

FIG. 8 illustrates an further exemplary cast structure, in accordance with at least one aspect of the present disclosure. In some examples, as shown in FIG. 8, the single casting comprises an extended portion that spans the width of the vehicle, or rather, extends across the length of the crossmember of the vehicle frame. In addition, the additional fixing points 810A-B may also comprise additional receiving portions to receive the outer fixings of the suspension arms of the vehicle in an assembled configuration. In some examples, the cast structure further comprises an extended portion attachable to a second mounting feature of the vehicle frame, wherein the extended portion replaces the first crossmember of the vehicle. In this configuration, a further component has been removed from the prior system known in the art, and the entire suspension system and motor are mounted to the casting. This can be done prior to fixing to the vehicle on a production line.

Figure 9:
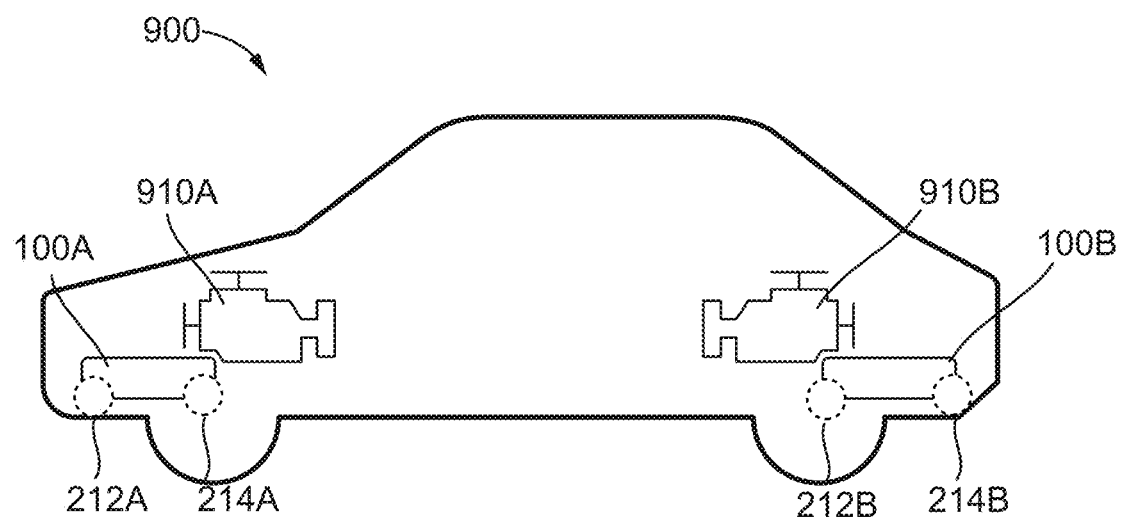
FIG. 9 illustrates a cut-away of an exemplary vehicle comprising a cast structure, in accordance with at least one of the examples described herein.

FIG. 9 illustrates a vehicle 900 comprising a power unit 910, an exemplary single cast suspension and drive assembly 100, and first and second support members 212 and 214, in accordance with at least one of the examples described herein. Optionally, and as shown in FIG. 9, a second cast structure assembly may be present in the vehicle 900, denoted by the suffix label 13'. In some examples, the vehicle 900 comprises the vehicle subframe assembly 300 as described in the second aspect. In particular, the vehicle 900 comprises a body portion having mounting features and the subframe assembly 300 comprises a suspension arm; and a cast structure 100. The cast structure 100 comprises a first fixing point attachable to the body portion; a first feature configured to receive the suspension arm of the vehicle in an assembled configuration; and a first portion configured to support a motor of the vehicle in an assembled configuration. It will be understood by a person skilled in the art that the vehicle 900 will further comprise a plurality of other components, such as, infotainment systems, seats, doors, transmission, steering, and the like, and numerous combinations thereof.

The apparatus, systems, and methods described above should be considered as applying to a vehicle such as vehicle 900. However, the present disclosure is not limited to the set-up shown in FIGS. 1-8. For example, the single cast may be only one in number, may be only located at the back of the vehicle, and the like. The vehicle may also comprise a controller (not shown), such as a stand-alone controller, or any other appropriate controller of the hybrid vehicle to control the engine. For example, the controller may, at least in part, be integrated with another controller of the vehicle. Furthermore, the controller may be configured to operationally communicate with any one or more of the vehicle components. For example, controller may be a stand-alone controller at least partially configured to operationally communicate with at least one low voltage accessory, an electric generator, and a high voltage component of the vehicle. Furthermore, it is understood that controller may be configured to carry out one or more of the above-disclosed electrical power control methods for a hybrid vehicle, as described above.

Figure 10:
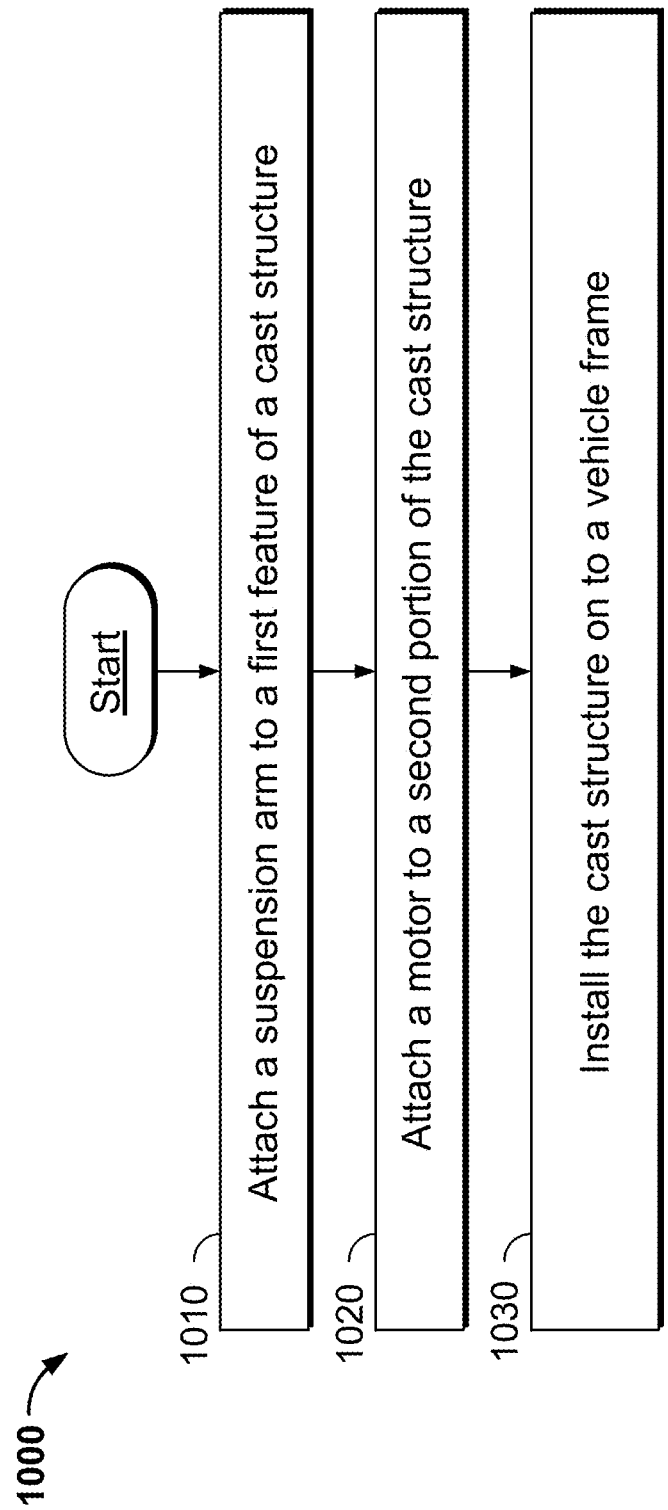
FIG. 10 illustrates a flow diagram of an exemplary method, in accordance with at least one of the examples described herein

FIG. 10 illustrates a flowchart comprising a vehicle assembly method, in accordance with some examples of the disclosure. It should be noted that process 1000 or any step thereof could be performed on, or provided by, any of the devices or manufacturing processes described herein. In addition, one or more steps of process 400 may be incorporated into or combined with one or more steps of any other process or rearranged.

The vehicle assembly method 100, for assembling a suspension arm and a cast structure to a vehicle, such as vehicle 900, comprises a cast structure configured to support a suspension arm and a motor of the vehicle. In particular, the cast structure comprises a first fixing point attachable to a first mounting feature of a first crossmember of a vehicle frame, a first feature configured to receive the suspension arm of the vehicle in an assembled configuration, and a first portion configured to support a motor of the vehicle in an assembled configuration. The vehicle assembly method 1000 comprises a plurality of steps. At step 1010, the suspension arm to a first feature is attached. At step 1020, the motor is attached to the first portion. At step 1030, the cast structure is installed on to the vehicle frame.

In some examples, the suspension arm is attached to the cast structure prior to installation to the vehicle frame. In some examples, the method further comprises attaching a motor mount to the first portion before attaching the motor to the first portion.

Figure 11:
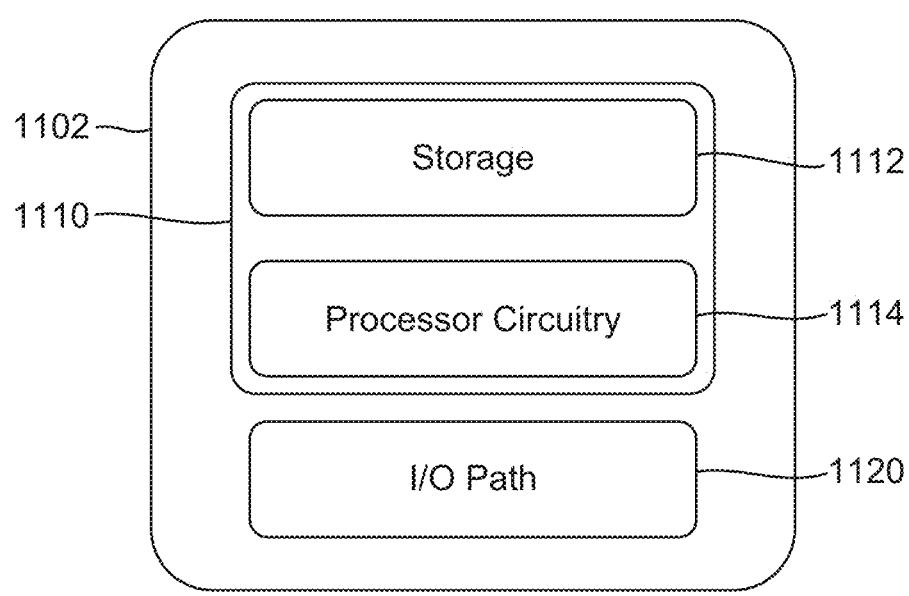
FIG. 11 illustrates a controller of an exemplary method, in accordance with at least one of the examples described herein.

FIG. 11 illustrates a block diagram 1100 of computing module 1102, in accordance with some examples of the disclosure. In some examples, computing module 1102 may be communicatively connected to a user interface. In some examples, computing module 1102, may be the controller of the vehicle 900 as described in FIG. 9. In some examples, computing module 1102 may include processing circuitry, control circuitry, and storage (e.g., RAM, ROM, hard disk, a removable disk, etc.). Computing module 1102 may include an input/output path 1106. I/O path 1120 may provide device information, or other data, over a local area network (LAN) or wide area network (WAN), and/or other content and data to control circuitry 1110, which includes processing circuitry 1114 and storage 1112. Control circuitry 1110 may be used to send and receive commands, requests, signals (digital and analog), and other suitable data using I/O path 1120. I/O path 1120 may connect control circuitry 1110 (and specifically processing circuitry 1114) to one or more communications paths. In some examples, computing module 1102 may be an onboard computer of a vehicle, such as vehicle 900.

Control circuitry 1110 may be based on any suitable processing circuitry such as processing circuitry 1114. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some examples, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some examples, control circuitry 1114 executes instructions for computing module 1102 stored in memory (e.g., storage 1112).

The memory may be an electronic storage device provided as storage 1112, which is part of control circuitry 1110. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same.

Computing module 1102 may be coupled to a communications network. The communication network may be one or more networks including the Internet, a mobile phone network, mobile voice or data network (e.g., a 3G, 4G, 5G or LTE network), mesh network, peer-to-peer network, cable network, cable reception (e.g., coaxial), microwave link, DSL reception, cable internet reception, fiber reception, over-the-air infrastructure or other types of communications network or combinations of communications networks. Computing module 1102 may be coupled to a second communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

In some examples, the control circuitry 1110 is configured to carry out any of the methods as described herein. For example, storage 1112 may be a non-transitory computer-readable medium having instructions encoded thereon, to be carried out by processing circuitry 1114, which causes control circuitry 1110 to carry out a method for controlling a power unit of a vehicle comprising a suspension trailing arm, a power drive unit, and a single cast component as described above. For example, the control circuitry may carry out a method controlling the ride height of the vehicle, the stiffness of the suspension, the acceleration/deceleration characteristics of the power unit, and the like; to achieve an improved handling or noise level requirements.

It should be understood that the examples described above are not mutually exclusive with any of the other examples described with reference to FIGS. 1-11. The order of the description of any examples is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The disclosure of this invention is made for the purpose of illustrating the general principles of the systems and processes discussed above and are intended to be illustrative rather than limiting. More generally, the above disclosure is meant to be exemplary and not limiting and the scope of the invention is best determined by reference to the appended claims. In other words, only the claims that follow are meant to set bounds as to what the present disclosure includes.

While the present disclosure is described with reference to particular example applications, shall be appreciated that the invention is not limited hereto. It will be apparent to those skilled in the art that various modifications and improvements may be made without departing from the scope and spirit of the present invention. Those skilled in the art would appreciate that the actions of the processes discussed herein may be omitted, modified, combined, and/or rearranged, and any additional actions may be performed without departing from the scope of the invention.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A cast structure configured to support a suspension arm and a motor of a vehicle, the cast structure comprising:
   a first fixing point attachable on top of a first crossmember of a vehicle frame;
   a first feature configured to receive the suspension arm of the vehicle in an assembled configuration; and
   a first portion configured to attach to and support the motor of the vehicle in an assembled configuration.

2. The cast structure of claim 1, wherein the first fixing point is attachable to a first mounting feature of the first crossmember of the vehicle frame and the first mounting feature comprises a first fixing location for the suspension arm.

3. The cast structure of claim 1, wherein the first portion comprises a motor mount.

4. The cast structure of claim 3, wherein the first fixing point is attachable to a first mounting feature of the first crossmember of the vehicle frame and the motor mount is attachable to the first mounting feature.

5. The cast structure of claim 3, wherein the motor mount is integral to the cast structure.

6. The cast structure of claim 3, further comprising a secondary isolation bushing on the motor mount.

7. The cast structure of claim 1, wherein the first fixing point is attachable to a first mounting feature of the first crossmember of the vehicle frame and the first fixing point attached to the first mounting feature comprises a secondary isolation bushing.

8. The cast structure of claim 1, wherein the single cast structure comprises tool clearances for the first fixing point.

9. The cast structure of claim 8, wherein the tool clearances are in a vertical axis, orthogonal to a longitudinal and a lateral axis of the cast structure.

10. The cast structure of claim 1, further comprising a plurality of second fixing points attachable to a second mounting feature of a second crossmember of the vehicle frame, wherein the single cast structure spans a gap between the first and second crossmember of the vehicle.

11. The cast structure of claim 10, wherein the first fixing point and plurality of second fixing points are in the same lateral plane, bound by lateral and longitudinal axes.

12. The cast structure of claim 11, wherein the first fixing point and plurality of second fixing points are distributed across the lateral plane.

13. The cast structure of claim 10, wherein the plurality of second fixing points extend across the length of the second crossmember of the vehicle frame.

14. The cast structure of claim 1, wherein the cast structure is symmetrical about a longitudinal axis.

15. The cast structure of claim 1, further comprising an extended portion attachable to a second mounting feature of the vehicle frame, wherein the extended portion replaces the first crossmember of the vehicle.

16. A vehicle subframe assembly, the assembly comprising:
 a suspension arm;
 a first crossmember; and
 a cast structure on top of the first crossmember, wherein the cast structure comprises a first feature configured to receive the suspension arm, and a first portion configured to attach to and support a motor of the vehicle in an assembled configuration.

17. The assembly of claim 16, further comprising the motor of the vehicle attached to the cast structure.

18. A vehicle comprising the vehicle subframe assembly of claim 16.

19. A vehicle assembly method for assembling a suspension arm and a cast structure to a vehicle, the cast structure configured to support a suspension arm and a motor of the vehicle, the cast structure comprising: a first fixing point attachable on top of a first crossmember of a vehicle frame; a first feature configured to receive the suspension arm of the vehicle in an assembled configuration; and a first portion configured to support the motor of the vehicle in an assembled configuration, the method comprising:
 attaching the suspension arm to the first feature;
 attaching the motor to the first portion; and
 installing the cast structure to the vehicle frame.

* * * * *